United States Patent

Lee et al.

[11] Patent Number: 6,051,135
[45] Date of Patent: Apr. 18, 2000

[54] APPARATUS FOR MAKING AQUEOUS CHLORINE DIOXIDE AND APPARATUS FOR TREATING WATER WITH AQUEOUS CHLORINE DIOXIDE

[75] Inventors: Sunggyu Lee, Akron, Ohio; H. Bryan Lanterman, Columbia, Mo.

[73] Assignee: Water Technologies Limited, Charlotte, N.C.

[21] Appl. No.: 09/141,352

[22] Filed: Aug. 27, 1998

Related U.S. Application Data

[63] Continuation-in-part of application No. 08/606,283, Feb. 23, 1996, Pat. No. 5,855,861, and a continuation-in-part of application No. PCT/US97/02157, Feb. 21, 1997, abandoned.

[51] Int. Cl.⁷ .................................................. C01B 11/02
[52] U.S. Cl. ...................... 210/192; 210/198.1; 422/187; 422/291
[58] Field of Search ..................................... 210/188, 192, 210/198.1; 252/187.21; 422/187, 291; 423/477

[56] References Cited

U.S. PATENT DOCUMENTS

| | | | |
|---|---|---|---|
| 3,867,509 | 2/1975 | Greiger et al. | 423/236 |
| 4,084,747 | 4/1978 | Alliger | 424/65 |
| 4,143,115 | 3/1979 | Ward et al. | 422/113 |
| 4,247,531 | 1/1981 | Hicks | 423/477 |
| 4,250,144 | 2/1981 | Ratigan | 422/112 |
| 4,292,292 | 9/1981 | Hicks et al. | 423/477 |
| 4,432,856 | 2/1984 | Murakami et al. | 204/237 |
| 4,534,952 | 8/1985 | Rapson et al. | 423/478 |
| 4,538,545 | 9/1985 | English et al. | 118/679 |
| 4,542,008 | 9/1985 | Capuano et al. | 423/477 |
| 4,547,381 | 10/1985 | Mason et al. | 426/316 |
| 4,585,482 | 4/1986 | Tice et al. | 106/15.05 |
| 4,590,057 | 5/1986 | Hicks | 423/477 |
| 4,618,479 | 10/1986 | Santillie et al. | 422/202 |
| 4,689,169 | 8/1987 | Mason et al. | 252/186.24 |
| 4,731,193 | 3/1988 | Mason et al. | 252/95 |
| 4,801,353 | 1/1989 | Mason | 162/73 |
| 4,889,654 | 12/1989 | Mason et al. | 252/100 |
| 4,925,645 | 5/1990 | Mason | 423/477 |
| 4,944,920 | 7/1990 | Rubinstein | 422/37 |
| 4,945,992 | 8/1990 | Sacco | 166/310 |
| 4,968,501 | 11/1990 | Mason | 423/243 |
| 5,122,282 | 6/1992 | Mason | 210/754 |
| 5,171,442 | 12/1992 | Nakshbendi | 210/256 |
| 5,211,912 | 5/1993 | Rubinstein | 422/37 |
| 5,258,171 | 11/1993 | Eltomi | 423/477 |
| 5,290,524 | 3/1994 | Rosenblatt et al. | 422/305 |
| 5,360,574 | 11/1994 | Iwahashi | 252/187.21 |

FOREIGN PATENT DOCUMENTS

| | | |
|---|---|---|
| 959238 | 12/1974 | Canada . |
| 9317960 | 9/1993 | WIPO . |

*Primary Examiner*—David A. Simmons
*Assistant Examiner*—Betsey J. Morrison
*Attorney, Agent, or Firm*—Foley & Lardner

[57] ABSTRACT

A method and apparatus for forming an aqueous chlorine dioxide solution is disclosed which includes reacting in a reaction vessel an acid reaction solution containing a hydroxy carboxylic acid and a companion acid with an alkali metal salt of a chlorite ion. In accordance with the process, the hydroxy carboxylic acid serves to temporarily transfer chlorine from and does not form a salt with the alkali metal salt of a chlorite ion. The aqueous chlorine dioxide solution produced is substantially free of chlorous acid and preferably is free of other by-products such as sodium chloride and free chlorine. The method further includes maintaining the reaction vessel at a pH of less than 5 and/or withdrawing at least a portion of the chlorine dioxide from the aqueous chlorine dioxide solution. The method enables rapid, efficient, compact and safe generation of chlorine dioxide. A method of disinfecting water, and apparatus for making chlorine dioxide and for disinfecting water also are provided.

7 Claims, 6 Drawing Sheets

FIG. 6a
FIG. 6b
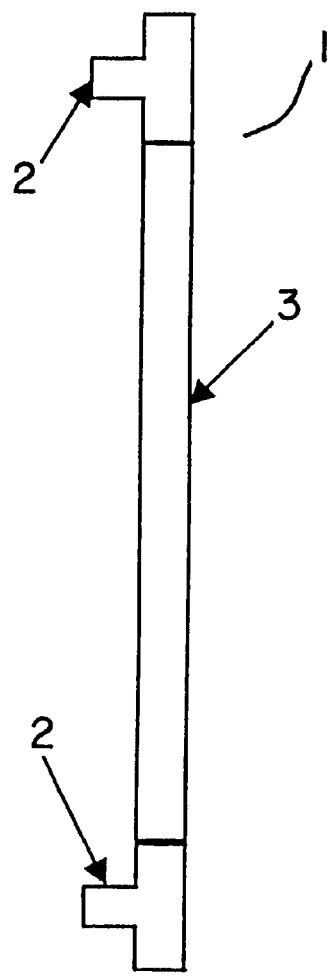
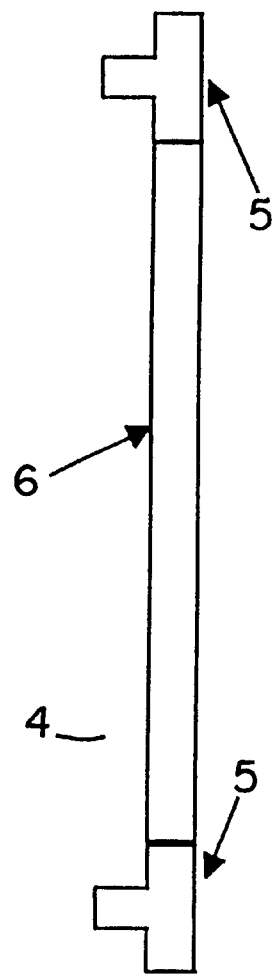

APPARATUS FOR MAKING AQUEOUS CHLORINE DIOXIDE AND APPARATUS FOR TREATING WATER WITH AQUEOUS CHLORINE DIOXIDE

CROSS-REFERENCES TO RELATED APPLICATIONS

This application is a continuation-in-part of U.S. Ser. No. 08/606,283 filed on Feb. 23, 1996, now U.S. Pat. No. 5,855,861, which is expressly incorporated by references in its entirety, and is a continuation-in-part of PCT/US97/02157, filed Feb. 21, 1997, now abandoned.

BACKGROUND OF THE INVENTION

1. Field of the Invention

This disclosure provides an apparatus for the production of chlorine dioxide and for the treatment of water and/or wastewater. More particularly, the present invention is directed to processes and apparatus for production of a high concentration aqueous solution of chlorine dioxide without producing undesirable side products such as free chlorine or chlorous acid. The chlorine dioxide according to the present invention can be produced on site and can be used, inter alia, as a disinfectant in the treatment of water and wastewater.

2. Description of Related Art

Chlorine dioxide is a strong oxidant that has been receiving increased attention as an alternative to chlorine for the disinfection and taste/odor (T/O) control of water and waste water. The molecular formula of chlorine dioxide is expressed as $ClO_2$. As implied from its chemical formula, it has the disinfecting properties of both chlorine and oxygen. Moreover, chlorine dioxide exhibits a promise of good disinfection performance without the disadvantages of forming large quantities of undesirable chlorinated byproducts since it does not react with hydrocarbons to form chlorinated hydrocarbons.

Chlorine dioxide ($ClO_2$) first was discovered in 1811 in the form of a greenish yellow gas by Sir Humphrey Davy, by reacting potassium chlorate ($KClO_3$) with hydrochloric acid (HCl). It later was found that $ClO_2$ could be used in a dilute acetic acid ($CH_3COOH$) solution for the bleaching of paper pulp. Even though the outstanding disinfecting properties of chlorine dioxide have been constantly noted, its practical application was hampered due to the lack of a safe and economical way of synthesizing it. In the 1930's, the Mathieson Alkali Works developed the first commercial process for making $ClO_2$, from sodium chlorate ($NaClO_3$) via sodium chlorite ($NaClO_2$).

In 1944, the Niagara Falls Water Treatment Plant No. 2 was the first U.S. water treatment facility to use $ClO_2$. $ClO_2$ was used to treat a potable water supply for taste and odor (T/O) control, especially T/O from phenolic compounds. Industrial waste water streams commonly contain phenolic compounds and ammonium salts. Other U.S. plants soon after adopted $ClO_2$ for water treatment; for example, Greenwood, S.C., Tonawanda, N.Y., Lockport, N.Y., etc. By 1958, over 150 municipal water plants adopted $ClO_2$. In 1978, a survey showed that 84 U.S. plants were using $ClO_2$ and that most of these plants were older plants. In Europe, over 500 water treatment plants were believed to be using $ClO_2$ for water treatment in 1978.

In the 1990's, the U.S. EPA recommended that, as a part of the reauthorization of the Clean Water Act, a study should be undertaken to develop a strategy to prohibit, reduce, or find substitutes for the use of chlorine and chlorinated compounds. In recent years, free chlorine ($Cl_2$) has been criticized by environmentalists, even though it is one of the most heavily used chemicals in various chemical and environmental applications. The disadvantages associated with using free chlorine can be summarized as follows:

(1) It is quite reactive with various substances including water, ammonia, and hydrocarbons;

(2) Even with water, it reacts to produce hydrochloric acid and hypochlorous acid;

(3) Solubility in water is relatively low making it difficult to adequately disinfect without affecting the vapor space above;

(4) Chlorine is not effective in taste and odor (T/O) control, due to its low water solubility, own pungent odor, and acidic reaction; and (5) It is produced only as a bulk chemical commodity. A small batch capability does not exist, because on-site generation of chlorine is commercially unattractive. This makes chlorine unsuitable for wastewater treatment.

For at least these reasons, the replacement of chlorine with other chemicals such as chlorine dioxide has been the subject of a great deal of interest in the recent years.

Chlorine dioxide is known to be an excellent disinfectant as well as a strong oxidizing agent. Its bactericidal, fungicidal, algicidal, bleaching, and deodorizing properties are well documented in various sources of literature. Chlorine dioxide is soluble in water at room temperature (20° C.) to about 2.9 grams $ClO_2$ per liter of water at 30 mmHg partial pressure of $ClO_2$, or 8 grams per liter at 80 mmHg partial pressure. $ClO_2$ is approximately 5 times more soluble in water than chlorine gas ($Cl_2$). $ClO_2$ is much more soluble in water than oxygen ($O_2$) which only has 9.2 mg solubility per liter of water. The presence of chlorine dioxide in water is very easily detected by a color change. The color in water changes from yellowish green to orange red as the concentration of $ClO_2$ increases in water. At low temperatures, chlorine dioxide dissolves in water to a substantially greater extent due to lower vapor pressure, e.g., 12 g/L at 60 mmHg of partial pressure and 10° C. FIG. 1 shows the solubility of $ClO_2$ in water as a function of temperature. It can be seen that a lower temperature is preferred for higher aqueous solubility.

The boiling point (b.p.) of liquid $ClO_2$ is 11° C. and the melting point (m.p.) is minus 59° C. Gaseous $ClO_2$ has a density of 2.4 (when taking air as 1.0) and its molecular weight is 67.45 g/mol, i.e., it is a heavier gas than air. If chlorine dioxide is leaked into the air, it will tend to stay low, near the ground, then gradually diffuse into the atmosphere.

Chlorine dioxide ($ClO_2$) differs from $Cl_2$ in that $ClO_2$ does not react with water or ammonia. Also, unlike chlorine, $ClO_2$ does not produce chlorinated hydrocarbons after reacting with hydrocarbons. In general, $ClO_2$ is less corrosive to most metallic and nonmetallic substances than chlorine, which is an important advantage.

It is also notable that $ClO_2$ is quite volatile and therefore can be removed easily from aqueous solutions with minimum aeration. Concentrations of $ClO_2$ in air above 11% can be mildly explosive. Due to the chlorine dioxide's relative instability and volatility, storage and transportation seem intuitively less economical, even though it is conceivable to store it in a compressed container. In this regard, the strategy of $ClO_2$ production can be two-fold, viz., either on-site production or high purity compressed $ClO_2$.

There have been several, but primarily three basic processes developed for the synthesis of $ClO_2$ that have been commercially applied to water treatment operations. All three processes involve sodium chlorite (NaClO$_2$) as one of the starting raw materials. The basic process chemistry of the three processes are discussed below.

Process 1: Process with Sodium Chlorite and Strong Acid

In this process, a strong acid is used along with sodium chlorite. The strong acid normally is hydrochloric acid or sulfuric acid. Using hydrochloric acid, the reaction stoichiometry is:

$$5NaClO_2+4HCl \rightarrow 4ClO_2+5NaCl+2H_2O \quad (R1)$$

As shown, for every mole of ClO$_2$ (i.e., 67.45 grams of ClO$_2$) to be produced, the reaction requires 1.25 moles of sodium chlorite (i.e., 113.06 grams of NaClO$_2$) and another mole of hydrogen chloride (i.e., 36.45 grams of HCl), assuming there is 100% conversion efficiency, which is impossible to expect from this process. Furthermore, 1.25 moles of sodium chloride salt (i.e., 73.13 grams of salt) are a by-product of each mole of chlorine dioxide produced.

Alternatively, chlorine dioxide can be produced using sulfuric acid, according to the following reaction:

$$10NaClO_2+5H_2SO_4 \rightarrow 8ClO_2+5Na_2SO_4+2HCl+4H_2O \quad (R2)$$

A very similar situation to the above HCl case is expected, i.e., requirement of strong acid and production of sodium sulfate salt. Again, strong acids are disadvantageous due to their corrosive behavior, and the formation of large quantities of alkali metal salts such as sodium salts is disadvantageous because such salts typically must be removed by extraneous purification techniques. Of these two options, the HCl route seems to be more popular.

Process 2: Process with Sodium Chlorite and Gaseous Chlorine

This process uses gaseous chlorine along with sodium chlorite. The process operates in two stages, first beginning with the formation of an aqueous hypochlorous acid, i.e., $$Cl_2+H_2O \rightarrow HOCl+HCl \quad (R3)$$

The intermediate product, hypochlorous acid (HOCl), in turn reacts with sodium chlorite to form chlorine dioxide (ClO$_2$), i.e., $$HOCl+HCl+2NaClO_2 \rightarrow 2ClO_2+2NaCl+H_2O \quad (R4)$$

The stoichiometric reaction, which is a summation of the two, becomes $$Cl_2+2NaClO_2 \rightarrow 2ClO_2+2NaCl \quad (R5)$$

This process, however, involves chlorine and its attendant disadvantages. Furthermore, the process also involves an unstable intermediate, HOCl, thereby substantially limiting the process efficiency. The formation of hypochlorous acid (HOCl) can be very hazardous at elevated temperatures due to its volatility and propensity to release toxic chlorine gas. A fairly sizable amount of salt production also occurs.

Process 3: Process with Sodium Chlorite and Sodium Hypochlorite

In this process, sodium hypochlorite (NaOCl) is used as a raw material along with sodium chlorite:

$$NaOCl+HCl \rightarrow NaCl+HOCl \quad (R6)$$

$$HCl+HOCl+2NaClO_2 \rightarrow 2ClO_2+2NaCl+H_2O \quad (R7)$$

This process has several similarities with the earlier two processes, i.e., involvement of hypochlorous acid (HOCl), use of strong hydrochloric acid as a raw material, byproduct salt formation, etc. Due to the presence of sodium hypochlorite, the process intuitively seems to provide more bleaching possibility.

For much larger users of ClO$_2$, such as for bleaching paper pulps, chlorine dioxide demands are much higher than in water treatment plants. In such applications, the sodium chlorite production step can become a part of the entire ClO$_2$ generation process. This process has major drawbacks of using (1) sodium hypochlorite (NaOCl) that is expensive, and (2) hydrochloric acid (HCl) that is strongly corrosive.

U.S. Pat. Nos. 4,925,645 and 5,122,282 describe a process for the production of chlorine dioxide, and a method of treating water and/or wastewater using chlorine dioxide, respectively. According to these patents, the process of making chlorine dioxide includes the steps of combining lactic acid or citric acid with sodium chlorite or alkaline earth metal to yield a salt of an acid and chlorous acid. They state further that the products produced from the methods described therein include, inter alia, chlorine dioxide, as well as free chlorine, chlorous acid and chloric acid. The reaction mechanisms described therein are as follows:

1. CH$_3$CH(OH)COOH + NaClO$_2$ $\longrightarrow$ (R8)
   (lactic acid) (sodium chlorite)

CH$_3$CH(OH)COONa + HClO$_2$
   (salt of lactic acid) (chlorous acid)

2a. HClO$_2$ + Non Fully Oxidized Organics, $\longrightarrow$ (R9a)
    Inorganics or Pathogens HClO + Oxidized Organics,
           Inorganics or Pathogens 2b. 2HClO$_2$ $\longrightarrow$ HClO + HClO$_3$ (R9b)
    (chlorous acid) (Hypochlorous acid) (chloric acid)

3. HClO + 2HClO$_2$ $\longrightarrow$ 2ClO$_2$ + H$_2$O + HCl (R10)
   (This reaction occurs in absence chloric ion)

4. ClO$_2$ + Non Fully Oxidized Organics, $\longrightarrow$ (R11)
   Inorganics or Pathogens HClO$_2$ + Oxidized Organics,
            Inorganics or Pathogens 5. HClO + Cl$^-$ + H$^+$ $\rightleftharpoons$ Cl$_2$ + H$_2$O (R12)

6. Cl$_2$ + Organics, Inorganics $\longrightarrow$ (R13)
   or Pathogens

Oxidized Organics, Inorganics
   or Pathogens

The chlorine dioxide along with co-produced chlorine gas and chlorous acid are described by these patents as having the biocidal effect. As described above, the co-production of these chemicals is hazardous and disadvantageous. In addition, these patents claim to produce a chlorine dioxide solution that is stable for over 30 days. The present inventor has found that aqueous solutions of chlorine dioxide cannot remain stable under normal conditions for 30 days using the guidelines provided in those patents. Due to the inherent instability of aqueous chlorine dioxide solutions, the present apparatus is intended to be used to manufacture chlorine dioxide on-site.

U.S. Pat. No. 4,084,747 describes a chlorine dioxide germ killing composition which is produced by contacting an acid material with sodium chlorite in an aqueous medium with a pH of less than 7. The '747 patent states that the lactic acid can be used in conjunction with other organic and inorganic acids. Disadvantages are described, however, when combinations of lactic acid and additional acids are used, compared to lactic acid alone. In addition, the '747 patent discloses a process by which undesirable by-products such as sodium lactate and chlorous acid are produced and hence, must be removed. The chlorine dioxide is used in a concentration of from 100 to 500 ppm up to 2700 to 3300 ppm.

U.S. Pat. No. 4,585,482 describes a process for producing a biocidal composition that liberates chlorine dioxide. The composition releases the chlorine dioxide when the pH is lowered to less than about 7 by an organic acid generating polymer. Thus, these documents describe a process for producing chlorine dioxide which involves either (i) the use of free chlorine or corrosive strong acids such as HCl and $H_2SO_4$ or (ii) the co-production of hazardous by-products such as free chlorine, chlorous acid, and the like.

Conventional chlorine dioxide solutions prepared using methods disclosed in the aforementioned prior art suffer from the drawbacks that they produce undesirable by-products. In addition, the reactions involved using the methods and apparatus described, i.e., merely mixing the reactants in a reactor usually at ambient temperatures and pressures, or slight modifications thereof, proceed at commercially unacceptable slow rates and produce relatively low concentrations of chlorine dioxide, i.e., on the order of less than about 5,000 mg/l of chlorine dioxide.

Thus, there exists a need to provide an economic and efficient apparatus for producing chlorine dioxide that does not also produce hazardous by-products (e.g., chlorine or chlorous acid), as well as substantial amounts of unusable salts (e.g., sodium chloride, sodium lactate). There also exists a need for a method of producing chlorine dioxide that does not suffer from the aforementioned disadvantages with respect to the slow rate of reaction and the low concentrations of chlorine dioxide. Lastly, there exists a need for an apparatus capable of accomplishing such methods and an apparatus for treating water and/or waste water using the aqueous chlorine dioxide so produced.

SUMMARY OF THE INVENTION

An object of the present invention is therefore to provide an apparatus for the production of chlorine dioxide that does not suffer from the drawbacks of the known art described above. Another object of the present invention is to provide a process of treating water whereby an effective amount of a chlorine dioxide solution is added to water to produce the desired disinfectant property.

An additional object of the present invention is to provide a process and apparatus for the production of chlorine dioxide which have:
  simplified reproducible chemistry;
  the use of weaker acids and less acid than the processes of the related art;
  no chlorine or chlorous acid produced as byproducts;
  mild reaction conditions;
  a high selectivity of chlorine dioxide and minimum selectivity of undesired by-products;
  an increased reaction rate to decrease total reaction time;
  a low capital investment requirement; and
  a high yield of chlorine dioxide.

In accomplishing the foregoing objects, there is provided according to one aspect of the invention, an apparatus for making chlorine dioxide and an apparatus for disinfecting water or wastewater whereby the apparatus for making chlorine dioxide includes mechanisms for feeding solutions containing a hydroxy carboxylic acid, a companion acid and an alkali metal of a chlorite ion to a reaction vessel, a reaction vessel and a mechanism for withdrawing product solution from the reaction vessel. The apparatus also can include a stripping unit whereby product solution is contacted with an inert gas to produce a product gas, and an absorbing unit whereby the product gas is contacted with an aqueous medium to produce an aqueous solution of chlorine dioxide.

The apparatus for disinfecting water or wastewater includes the aforementioned apparatus for producing chlorine dioxide and a mechanism for mixing the water (or wastewater) with the aqueous solution of chlorine dioxide and a mechanism for feeding the mixture of water and chlorine dioxide to a contact vessel whereby the mixture is retained for a period of time to effectively reduce the level of contaminants in the water, or to render contaminants in the water harmless.

Further objects, features and advantages of the present invention will become apparent from the detailed description of the preferred embodiment which follows.

BRIEF DESCRIPTION OF THE DRAWING

FIG. 6a is a schematic diagram of a stripper according to one embodiment of the present invention.

FIG. 6b is a schematic diagram of an absorber according to one embodiment of the present invention.

DETAILED DESCRIPTION OF THE PREFERRED EMBODIMENTS

Figure 1:
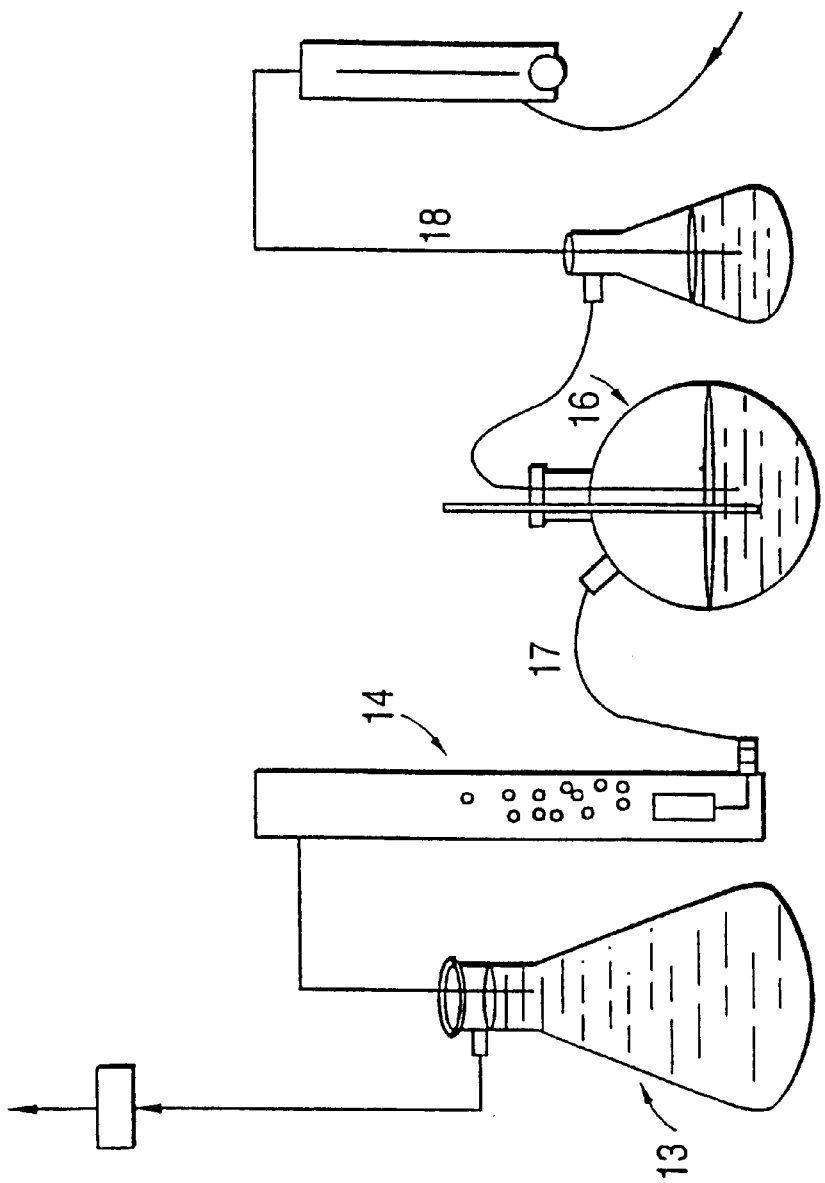
FIG. 1 is a schematic view of benchtop components used for producing chlorine dioxide according to one embodiment of the present invention.

Throughout this description, including the appended claims, the following terms are defined as follows:

The yield of $ClO_2$ can be defined in a number of ways:

(1) Reactants Basis:

$$\% \text{Yield}^1 = \frac{\text{Amount of ClO}_2 * 100\%}{(\text{Amount of NaClO}_2 \text{ Fed})\left(\frac{67.45}{90.45}\right)}$$

(2) Product Basis:

$$\% \text{ Yield}^2 = \frac{ClO_2 * 100\%}{\left(ClO_2 + ClO_3^- + \left(\frac{67.45}{83.45}\right)ClO_3^-\right)}$$

where the superscript 1 denotes reactant basis, the superscript 2 denotes product basis and the symbol * denotes a multiplication.

The product selectivity can also be represented in a number of different ways:

(1) Desired product concentrations basis:

$$\% \text{ Selectivity} = \frac{\text{Most Desired} * 100\%}{\text{Most Desired} + \text{Less or Not Desired}} = \frac{ClO_2 * 100\%}{ClO_2 + (ClO_3^-)\left(\frac{67.45}{83.45}\right)}$$

(2) Desired versus not (or less) desired:

$$\text{Selectivity Ratio} = \frac{\text{Desired}}{\text{Less Desired}} = \frac{ClO_2}{(ClO_3^-)\left(\frac{67.45}{83.45}\right)} = \frac{ClO_2}{ClO_3^-}$$

(3) Selectivity for both main and byproducts:

$$\% \text{ Selectivity} = \frac{\text{Most Desired} * 100\%}{\text{Most Desired} + \text{Less or Not Desired}} = \frac{ClO_w * 100\%}{ClO_2 + (ClO_3^-)\left(\frac{67.45}{83.45}\right)}$$

(4) Salt Selectivity:

$$\% \text{ Salt Selectivity} = \frac{\text{Salt}}{\text{Most Desired}} = \frac{\text{Salt} * 100\%}{ClO_2}$$

(5) Product Selectivity:

$$\% \text{ Selectivity} = \frac{[ClO_2 = (NaClO)_3] * 100\%}{(NaClO)_2 \text{ Fed}}$$

(6) Pure Product Selectivity:

$$\text{Selectivity} = \frac{ClO_2 * 100\%}{(NaClO)_2 \text{ Fed} * \left(\frac{67.45}{90.45}\right)}$$

Throughout this description, the expressions, "substantially free of chlorous acid" and "substantially free of free chlorine" denotes a solution that contains less than about 1 wt % chlorous acid or free chlorine, preferably, less than about 0.5 wt %, more preferably, less than 0.1 wt %, even more preferably, less than about 0.05 wt %, and most preferably, less than about 0.01 wt %, based on the total weight of the solution. Most advantageously, the expressions "substantially free of chlorous acid" and "substantially free of free chlorine" denote a solution that contains no chlorous acid or chlorine. Throughout this description, the expressions "acid gas" and "product gas" denote an inert gas that has absorbed either acid or chlorine dioxide product, respectively. Throughout this description, the expression "the companion acid does not react directly with the alkali metal salt of a chlorite ion" means that the function of the companion acid is to provide the acidity to the aqueous reaction solution and not to react with the alkali metal salt of a chlorite ion. In addition, this expression denotes a reaction whereby the alkali metal does not substantially form a salt with the companion acid, and the companion acid does not substantially react with the chlorite ions.

As described above, an aspect of the invention involves the reaction between a hydroxy carboxylic acid, a companion acid and an alkali metal salt of a chlorite ion. In one embodiment, the reaction takes place in a reaction vessel whereby (i) the pH of the reaction vessel is maintained at a value below 5, or (ii) at least a portion of the chlorine dioxide in the product solution is removed from the reaction vessel. Preferably, both steps (i) and (ii) are carried out. Throughout this description, the expression, "at least a portion," when referring to the removal of chlorine dioxide from the product solution, denotes at least about 10%, preferably, more than about 30%, more preferably, more than about 50% and even more preferably, more than about 90% of the total chlorine dioxide in the product solution. Most preferably, all of the chlorine dioxide in the product solution is removed. This expression is not intended to denote withdrawing a sample from the reaction vessel. In addition, throughout this description, the expression "at least a portion," when referring to the removal of acid from the aqueous acid solution or absorbing the acid from the acid gas into the reaction solution, denotes at least about 20%, preferably, more than about 30% and even more preferably, more than about 50% of the total acid in the aqueous acid solution. Most preferably, this expression, when referring to the removal of acid from the aqueous acid solution or absorbing the acid from the acid gas into the reaction solution, denotes all of the acid in the aqueous acid solution.

In a preferred embodiment of the invention the hydroxy carboxylic acid includes lactic acid and the companion acid is an additional organic acid such as acetic acid. In accordance with the invention, a sufficient amount of the companion acid is provided to maintain the pH of the aqueous reaction solution at $\leq 5$, preferably $\leq 4$. The present inventor found that merely mixing and reacting the respective components, i.e., hydroxy carboxylic acid, companion acid and alkali metal of a sodium chlorite ion, resulted in a significant increase in the pH of the reaction solution during the course of the reaction, even if the pH of the original reaction solution was substantially lower than 4. The inventor unexpectedly found that, if the pH of the reaction solution was not maintained below 5, then the reaction would proceed more slowly and produce a chlorine dioxide solution containing lower concentrations of chlorine dioxide (e.g., on the order of 20 to 500 mg/l over a period of one to three days).

In another preferred embodiment, the pH can be maintained by providing a source of an inert carrier gas; flowing the carrier gas through the aqueous acid solution that includes at least one of a companion acid and hydroxy carboxylic acid. At least a portion of the acid is entrained into the inert carrier gas to provide an acid gas. The acid gas then is introduced into the aqueous reaction solution whereby the at least a portion of the acid in the acid gas is absorbed into the aqueous reaction solution.

In yet another preferred embodiment, the acid concentration is increased by reducing the amount of water used in the process. In this embodiment, advantageously more than half, and preferably about two-thirds, of the water typically employed to make up the aqueous acid solution is removed, and then this aqueous acid solution (hereinafter referred to as "concentrated acid solution") is mixed with an aqueous solution of the alkali metal salt of a chlorite ion to generate the aqueous reaction solution.

According to another preferred embodiment, the reaction temperature can be maintained at a temperature within the range of from about 20° C. to about 60° C., and more preferably within the range of from about 30° C. to about 45° C. and most preferably at about 40° C. The inventors found that by carrying out the aforementioned reactions at a temperature of about 40° C., significantly higher yields of chlorine dioxide could be achieved in shorter periods of time.

In accordance with the present invention, instead of, or in addition to maintaining the pH of the reaction vessel at a value of less than 5, at least a portion of the aqueous product solution is removed from the reaction vessel either periodically or continuously during the reaction. In this embodiment, at least a portion of the chlorine dioxide present in the product solution then can be removed using methods well known to skilled artisans, for example, (i) stripping followed by absorption, (ii) a multi-stage (preferably two stage) countercurrent gas-liquid absorption mechanism or (iii) stripping followed by condensation and then subsequent absorption. In a preferred embodiment, the process further includes separating the chlorine dioxide from the aqueous reaction solution by flowing an inert carrier gas, (e.g., nitrogen or argon), through the aqueous reaction solution, wherein at least a portion of the chlorine dioxide is stripped out of the solution and is entrained in the inert gas due to the difference between the vapor pressure of the chlorine dioxide and the other reactants and reaction products in the aqueous reaction solution, to provide a product gas. In addition to the inert carrier gases noted above, air has been found to be suitable as a stripping gas, and in view of its lower cost is a preferred stripping gas. This product gas then can be either directly contacted with water in an absorber, or can first be condensed and the vapor from the condenser then subjected to absorption. Those skilled in the art recognize that the stripping/absorption, or stripping/ condensation/absorption can emanate either from the reaction solution within the reaction vessel itself, or from a product solution that has been withdrawn from the reaction vessel. In addition, the skilled artisan is capable of designing suitable stripping, absorption and condensation units to provide the necessary separations in accordance with the objectives and guidelines provided herein.

Alternatively, the acid gas that has passed through the acid solution can subsequently be passed through the reaction product solution to provide a product gas, which then can be further treated as described above. For example, the chlorine dioxide present in the product gas then can absorbed in an aqueous media, preferably water, to provide an aqueous chlorine dioxide solution. In an alternative embodiment, at least a portion of the aqueous reaction product solution can first be removed from the reactor and then contacted with the inert carrier gas to provide a product gas and a stripped product solution.

Other preferred embodiments of the process include a variety of combinations of the aforementioned embodiments. For example, the process may include: providing a hydroxy carboxylic acid that serves to temporarily transfer chlorine from and not substantially form a salt with an alkali metal of a chlorite ion that is added subsequently; providing a companion acid that will not directly react with an alkali metal salt of a chlorite ion which together with the hydroxy carboxylic acid provides an acid reaction solution; providing an alkali metal salt of a chlorite ion to create an aqueous reaction solution, wherein the hydroxy carboxylic acid and the companion acid acidify the aqueous reaction solution; and reacting the components in a reaction vessel; maintaining the reaction vessel at a temperature within the range of from about 20° C. to about 60° C., preferably at a temperature within the range of from about 30° C. to about 45° C.; providing a source of an inert carrier gas; flowing the inert carrier gas through the aqueous acid reaction solution, whereby at least a portion of either the hydroxy carboxylic acid or the companion acid, or preferably at least a portion of both, vaporizes into the inert carrier gas stream to provide an acid gas; flowing the acid gas through and into intimate contact with the aqueous reaction solution in an amount sufficient to maintain the reaction solution at a pH of less than about 5, preferably less than about 4; reacting the hydroxy carboxylic acid and the chlorite ions in the reaction vessel to form a product solution comprising at least chlorine dioxide, optionally removing at least a portion of chlorine dioxide from the product solution, wherein the product solution is substantially free of chlorous acid and free chlorine. Another preferred process of the invention further includes contacting the product solution with an inert gas, preferably nitrogen, whereby at least a portion of the chlorine dioxide vaporizes into the inert gas to create a product gas; and contacting the product gas with an aqueous medium, preferably water, to separate the chlorine dioxide from the product gas and to provide an aqueous solution of chlorine dioxide.

In yet another advantageous embodiment of the invention, a process for the continuous production of chlorine dioxide is provided. The process generally is similar to the processes described above only the reactants are continuously fed to the reaction vessel and product solution is continuously withdrawn and optionally treated. The continuous production of product solution is a particularly preferred embodiment of the invention. Once formed, the product solution is continuously withdrawn and transferred to a chlorine dioxide stripping unit. An inert gas is provided to the stripping unit and contacts the product solution, e.g., in a countercurrent manner. At least a portion of the chlorine dioxide in the product solution transfers to the inert gas to provide a product gas: The product gas then can be passed, e.g., into a condenser to condense any hydroxy carboxylic or companion acid present in the saturated inert gas, thereby producing an acid solution and a chlorine dioxide-containing gas. The chlorine dioxide-containing gas can then be passed to a chlorine dioxide scrubber where it is contacted with an aqueous solution such as water to form an aqueous chlorine dioxide solution and a scrubbed inert gas stream. In a particularly preferred embodiment, the condensed hydroxy carboxylic acid or companion acid can be recycled to the acid reaction solution, and the scrubbed inert gas stream can be recycled to the chlorine dioxide stripping unit.

In still another preferred embodiment of the present invention, the product solution emanating from the reactor is fed to a multi-stage, preferably a two-stage, counter-current cascade whereby the product solution first is contacted with an inert gas in the initial stage, and then is contacted with an aqueous medium, preferably water in subsequent stages to provide an aqueous solution of chlorine dioxide.

Other procedures for removing the chlorine dioxide from the product solution, to form an aqueous chlorine dioxide solution, may be readily apparent to skilled artisans.

The present invention also encompasses methods of disinfecting water using a chlorine dioxide solution prepared in accordance with the methods described above. Water in this context denotes any water, including municipal drinking or potable water, industrial wastewater, hazardous wastewater, fresh water and the like. The aqueous chlorine dioxide solution is admixed with the water in an amount and for a period of time sufficient to reduce the level of contaminants from the water, or to render the contaminants harmless. Those skilled in the art are capable of adding the effective amount and determining the appropriate retention time given the concentration of chlorine dioxide in the aqueous product solution, and given the contaminant that is to be removed. For example, if fecal coliform is to be removed or reduced to an acceptable level, one can refer to generally available charts to determine the concentration of chlorine dioxide required to effect the requisite removal or reduction. By using the aqueous chlorine dioxide solution of the present invention, much higher concentrations of chlorine dioxide solutions can be prepared in much shorter periods of time, thereby enabling a more efficient water disinfectant or water treatment regimen. Due to the inherent instability of aqueous chlorine dioxide solutions, it is preferred to admix the aqueous chlorine dioxide solution with the water to be treated within 120 hours after the chlorine dioxide solution has been made, and preferably within 72 hours.

(R14)

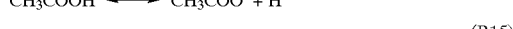

(R15)

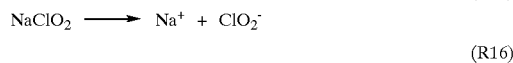

(R16)

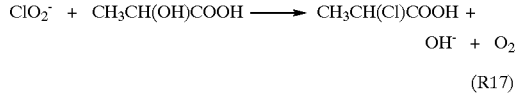

(R17)

(R18)

(R19)

(R20)

As noted above, an important feature of the present invention is that it does not involve the use of free chlorine or chlorous acid in the manufacturing process, and does not produce either of these compounds in the reaction product composition. Hence, additional apparatus mechanisms are not needed to remove these chemicals. This provides a more environmentally acceptable product. In addition, free chlorine in a water treatment system is reactive and is capable of converting hydrocarbons into chlorinated hydrocarbons which are known carcinogens. Moreover, chlorous acid is very temperature sensitive and any increases in temperature above 40° C. can be extremely dangerous. Thus, the present invention is very suitable in a water treatment system, where the water will be used for human consumption.

Due to the inherent instability of aqueous solutions of chlorine dioxide, the present method is intended to be carried out on-site with the produced chlorine dioxide product being used within a period of 120 hours, preferably within 72 hours. Most preferably, the chlorine dioxide solution so produced is contacted with water or wastewater shortly (e.g., within a few hours) after its production. Those skilled in the art recognize that an aqueous chlorine dioxide solution could remain stable longer if it is maintained under increased pressure and refrigeration, although such extraneous procedures result in significant increases in the costs of the product. The inventor further has found that the equipment needed to produce a treatment quantity of one ton/day of a 5,000 mg/l solution of $ClO_2$, by simply mixing the reactants together, is extremely large and is not amenable to producing chlorine dioxide on-site. The present invention therefore provides an efficient on-site, preferably portable, chlorine dioxide generation process and unit that is capable of providing a high concentration of chlorine dioxide in a relatively short period of time.

Any alkali metal salt of a chlorite ion can be used in accordance with the present invention so long as it follows the reactions outlined above. Usually, the alkali metal salt of a chlorite ion is selected from sodium chlorite and potassium chlorite. Preferably, sodium chlorite is used.

The present invention utilizes a relatively weak acid system of a hydroxy carboxylic acid and a companion acid that will not directly react with an alkali metal salt of a chlorite ion. Throughout this description, the expression, "relatively weak acid" denotes acids which are not recognized in the art as strong acids such as HCl, $H_2SO_4$, and the like. The organic hydroxy carboxylic acid is important in that it serves as a temporary chlorine transfer agent by producing the chlorine intermediate, $R_1CH(Cl)COOH$. While not wishing to be bound by any particular theory, this temporary transfer is believed by the present inventor to result from use of the companion acid, which permits the hydroxy carboxylic acid to perform the function without substantially forming a salt with the alkali metal. While many hydroxy carboxylic acids generally are more costly than mineral acids such as HCl and $H_2SO_4$, the corrosive nature of mineral acids and the extreme care required in handling such acids is largely avoided by the use of hydroxy carboxylic acids. Any hydroxy carboxylic acid of the formula $R_1CH(OH)COOH$ that can form a chlorine intermediate as shown above, can be used according to the present invention. $R_1$ can be any lower alkyl group which may or may not be substituted. Preferred organic hydroxy acids include butyric hydroxy acid, glycolic acid, $CH_2(COOH)CH_2CH(OH)COOH$, $CH_2(COOH)CH(OH)COOH$, lactic dicarboxylic acid $(CH_2C(OH)(COOH)_2)$, citric acid, gluconic acid, and malic acid, can be used. An especially preferred hydroxy carboxylic acid is lactic acid. Representative lists of hydroxy carboxylic acids which can be used in the method of the present invention are provided in, inter alia, U.S. Pat. No. 5,091,171.

The acidity for the process of the present invention usually is provided by an additional companion acid. Preferably, the companion acid is a relatively weak organic acid. This acid, like the hydroxy carboxylic acid is not environmentally detrimental when compared to strong mineral acids such as HCl and $H_2SO_4$. In addition, the use of an organic acid, such as acetic acid is advantageous in that large scale users of chlorine dioxide, like the paper and pulp industries, have been using $ClO_2$ in a dilute acetic acid solutions. Thus, many potential users of the chlorine dioxide produced according to the present invention already have storage and handling facilities for organic companion acids such as acetic acid.

Furthermore, the companion acid is not easily replaced by a stronger acid, such as hydrochloric acid or sulfuric acid, because when using HCl, the hydroxy carboxylic acid would not be capable of producing the required chlorine intermediate, $R_1CH(Cl)COOH$. In the case of sulfuric acid, the sulfuric acid will combine with sodium chlorite to produce sodium sulfate which is an undesirable by-product salt which must be removed from the product solution. Any organic acid of the general formula $R_2COOH$ and which does not interfere with the formation of the chlorine intermediate or does not react with the sodium chlorite to produce undesirable salts can be used according to the present invention. $R_2$ can be H or a lower alkyl which may or may not be substituted. Companion acids such as acetic acid are preferred.

In systems generally known in the art, substantial amounts of salts, usually NaCl or sodium sulfates, are produced. According to the present process, smaller amounts of NaCl and sodium chlorate are produced than the processes known in the art, and the production of sodium sulfates is avoided. In addition, while salt produced by known processes are generally troublesome, the sodium chlorate produced according to the present invention is somewhat beneficial, in that it has weak disinfecting/oxidizing capabilities. Furthermore, the sodium chlorate can be converted back into sodium chlorite by, for example, a reconstitution reaction. Those skilled in the art are capable of converting sodium chlorate to sodium chlorite.

The amount of water usually used corresponds generally to the amount of water typically present in conventional hydroxy carboxylic acid solutions and companion acid solutions. For example, hydroxy carboxylic acids such as lactic acid are commercially available as an 88% solution of lactic acid (i.e., 88% lactic acid and 12% water, by weight). Ostensibly, the amount of water typically included in the acid solution is within the range of from about 4 to about 7 times the total amount of acid, by weight, preferably, from about 5 to about 6.5, and most preferably, about 6 times. Hence, the water to acid ratio in the acid solution usually is within the range of from about 4 to about 7, and most preferably about 6. The amount of the companion acid is usually added in an amount sufficient to acidify the reaction mixture. In accordance with an embodiment of the invention, a more concentrated acid solution can be used, and can be added to the reactor either continuously, or incrementally over time. The aqueous acid solution can be concentrated by either adding additional acid or by deleting the amount of water. Preferably, the concentrated acid reaction solution contains water in an amount of from about 1.5 to 3.5 times the total amount of acid, by weight, and more preferably, about 3 times. Accordingly, to concentrate the aqueous acid solution, the water to acid ratio usually is within the range of from about 1.5 to about 3.5, and preferably about 3.

In preferred embodiments of the present invention, the process is carried out continuously whereby product solution is continuously withdrawn from the reactor. Any reactor can be used to react the aqueous acid solution and the alkali metal salt of a chlorite ion. Preferably, the reactor is selected from a continuous stirred tank reactor, a tubular reactor, and a plug flow reactor. More preferably, the reactor can be temperature controlled by placing the reactor in a water bath that can be maintained at a given temperature by external heating and cooling devices. Any mechanism for controlling the temperature of the reactor can be used with the present invention.

A tubular reactor is preferably employed in the present invention whereby the aqueous acid solution is reacted with an alkali metal salt of a chlorite ion in a tube. Generally, the tube is designed to have a length sufficient to provide enough detention time in the reactor to adequately react the ingredients given the flow rate of the reaction solution and the temperature of the water. Those skilled in the art are capable of designing a suitable tubular reactor given the objectives and guidelines presented herein. One particularly preferred reactor that can be used to make a suitable on-site aqueous chlorine dioxide generator is a temperature controlled tubular reactor containing one or more coils made of, for example, Teflon coated polyethylene tubings, whereby the coil(s) total about 150 to about 200 feet in length, whereby each coil(s) can have an internal volume of about 500 ml. The total reactor volume in this advantageous embodiment is about 1,500 ml. Those skilled in the art are capable of varying the size and shape of the reactor depending on the amount of aqueous chlorine dioxide to be produced, the flow rate of reactants, the pH of the aqueous reaction solution, the pH of the product solution and the temperature of the reactor. Those skilled in the art also are capable of modifying the temperature of the reactor.

The reaction time also can be varied in accordance with the present invention. For example, a batch reaction can take place whereby after a given period of time the reactants are withdrawn from the reactor or a portion of the reactants are withdrawn periodically. In the case of a continuous reactor, the flow rates of the reaction solutions (i.e., the acid reaction solution and the solution containing the alkali metal salt of a chlorite ion) can be varied as well as the rate at which the product solution is withdrawn from the reactor. Ideally, the faster the reaction, the more product produced in a given period. Preferably, the reaction time is within the range of from about 15 minutes to about 48 hours, more preferably, less than 24 hours, and most preferably, in the case of using a continuous process, the residence time in the reactor can be about 45 minutes, and even as low as about 20 minutes.

The apparatus of the present invention generally includes the appropriate devices and mechanisms for carrying out the methods described above. The apparatus typically includes an acid storage tank and a chlorite storage tank whereby an aqueous acid solution is retained in the acid storage tank, (the aqueous acid solution being the same aqueous acid solution described above), and a solution of an alkali metal salt of a chlorite ion is stored in the chlorite storage tank. Mechanisms are provided which can both feed the appropriate ingredients to the storage tanks and to withdraw solutions therefrom. Preferably, these mechanisms include pumps and feed lines sufficient to withstand the flow rate of aqueous acid solution and solutions of alkali metal salts of a chlorite ion. Those skilled in the art can readily determine an adequate size for the respective storage tanks, feed lines and pumps to effect the requisite feed rates of reactant solutions (i.e., aqueous acid solution and solution of an alkali metal salt of a chlorite ion). One particularly preferred embodiment of the invention includes two pumps (one for the aqueous acid solution and the other for the solution of the alkali metal salt of a chlorite ion) that operate at about the same level, for example at about 20 to about 300 cc/min, for a one-gallon reactor system.

Any pump can be used in the present apparatus as long as the pumps are capable of effecting the requisite flow rate and withstanding the corrosive nature of aqueous chlorine dioxide. Masterflex dual-head, peristaltic pumps are preferred based on the relatively trouble-free and metered pumping operation at efficient energy requirements. Any plunger-type pumps can also be used. Installation and replacement of these types of pumps also are very simple, thus simplifying the peripheral system. Even though most of the Masterflex pumps known in the art have an adjustable range of flow rates, it is preferred to keep the rate constant, i.e., set at the factory. Determining the requisite capacity of the pump is within the routine skill of those skilled in the art.

Several types of flow can be considered as possible options which can give rise to varying flow rates required for pumping the reactants to the reactor. They include:

(1) three raw materials separately and necessary make-up water;
(2) premixed acids, sodium chlorite and make-up water;
(3) premixed acids and sodium chlorite both of which contain pre-determined amounts of water in order to make the flow rate the same.

In accordance with the invention, design simplicity can be attained by inputting a mixed acid solution and a sodium chlorite solution at the same rate, thereby eliminating the use of cumbersome metering pumps and controls. In this case, the volumetric flow rate of the mixed acid solution and the sodium chlorite aqueous solution preferably should be at about the same rate, i.e., about 50 cm$^3$/min for a one-gallon reactor system, or more preferably about 47.4 cm$^3$/min for a one-gallon reactor system. If the process is to be operated for a larger-scale treatment plant, or for a drinking water plant, more complex, control-oriented approaches can be used.

Dual-head Masterflex pumps used to pump the raw materials can be directly connected to the pre-mixed solution tanks containing pre-mixed acid solutions and pre-mixed sodium chlorite solutions. Even though 55-gallon raw material tanks can be used directly as supply tanks, it is preferable to provide separate reactant supply tanks of larger than 55-gallon capacity, preferably, about 75–90 gallon capacity. Thus, unplugging and re-plugging of supply tanks can be altogether avoided, thereby eliminating the potential for odor and fume generation. Then, approximately 100 cm$^3$/min of flow from each tank can be drawn into the apparatus for $ClO_2$ generation for a one-gallon reactor system. The above flow rates and flow rates described below are described with respect to a one-gallon reactor system. Of course, if a larger size reactor is used, the rate would proportionally be increased to get the same result.

The mixed acid in the raw material tank does not typically go through any chemical reaction. Therefore, storage of mixed acids over an extended period of time does not pose any major problems. However, storage of sodium chlorite solution requires better care, since it may go through oxidation and decomposition. Sodium chlorite has mild reducing and oxidizing tendencies depending upon the surrounding conditions. Excessive sunlight exposure also should be avoided. Those skilled in the art are capable of designing suitable storage tanks for acid and sodium chlorite solutions using the guidelines provided herein.

The apparatus further includes a mechanism for mixing the aqueous acid solution and the solution containing the alkali metal salt of a chlorite ion to provide an aqueous reaction solution. Any mechanism that adequately mixes the aforementioned solutions can be used, including conventional tees or other joints that combine two streams into one, baffled piping or the use of a stirred vessel. A particular preferred mechanism for mixing includes a tee, followed by a tubing packed with glass beads. The aqueous reaction solution, upon mixing, then can be fed to a reaction vessel.

Any reactor that is capable of effecting the reaction between the aqueous acid solution and the alkali metal salt of a chlorite ion can be used including, continuous stirred reactors, simple tanks, plug-flow reactors and tubular reactors. A tubular reactor is particularly preferred. Advantageously, the reactor is temperature controlled by any mechanism capable of maintaining the reaction temperature at a given value. Those skilled in the art are familiar with various temperature controlled reactors and can design a suitable reactor given the objectives and guidelines provided herein. In addition, reference can be made to any available reference manual such as Perry & Chilton's CHEMICAL ENGINEERS' HANDBOOK, 6th Ed., McGraw-Hill, Inc., (1984), the disclosure of which is incorporated by reference herein in its entirety. Preferably, the reactor is a tubular reactor of about 150 to 200 feet in length in a water bath, whereby the tubular reactor is coiled within the water bath. In addition, the reactor preferably is maintained at a temperature of about 40° C. and provides a residence time of about 45 minutes.

Determining the reactor size can be important since it determines the system production capacity. For a fixed reactor size, there is a working range of $ClO_2$ productivity, i.e., minimum and maximum concentration of $ClO_2$ products. Specifically, the maximum limit becomes important because this limit should not be exceeded. Therefore, the size of reactor should be determined first, with respect to the requirements of the end-user. Optimizing the reactor size early in the design ensures that the reactor will not be operated in an overloaded manner, nor in an under-utilized fashion. Those skilled in the art are capable of sizing a suitable reactor given the guidelines presented herein.

A typical, portable, $ClO_2$ generator system for wastewater treatment may be based, for example, on a one gallon tubular reactor. Although a tubular reactor is preferred, any reactor capable of reacting the reactants and maintaining the temperature and pH of the reactants can be used. Suitable reactors include stirred tank, continuous stirred tank, plug flow and tubular reactors. Tubular reactors are preferred because:

(1) backmixing is detrimental to the process conversion
(2) progressive conversion is expected
(3) large vapor space, if permitted, is also detrimental to process operation.

The size of the reactor depends directly on the process retention time, or the reactor residence time. With a reactor volume of one gallon, if the process retention time is, for example, an hour, it would have a total throughput of 1 gallon/hour. If the residence time becomes shorter, then the process throughput would be increased accordingly. Along with the production throughput, an important factor to consider is the product concentration of $ClO_2$. Higher concentrations of $ClO_2$ product typically require higher percentages of raw materials, thus producing less unconverted sodium chlorite. Furthermore, from the standpoint of wastewater treatment itself, the amount of $ClO_2$ actually produced is more important than the total flow rate of aqueous solution. This absolute amount of pure $ClO_2$ as a production rate can be represented as the following mathematical product of the above factors:

$$ClO_2 \text{ Production rate (mg/h)} = ClO_2 \text{ Concentration (mg/L)} \times \text{Total Throughput (L/h)}$$

For example, a waste water unit that produces 1 gal/hr with a concentration of 10,000 mg $ClO_2$/l would generate pure $ClO_2$ at the following rate of:

$$\text{Pure } ClO_2 \text{ Production Rate (g/h)} = 10 \text{ g/L} \times 3.785 \text{ L/h} = 37.85 \text{ g/h}$$

Ostensibly, by increasing the throughput of reactants and products, the reactor residence time is shortened substantially. If the residence time is too short for a certain fixed production rate, however, then the resulting high flow rate could generate a large amount of unconverted sodium chlorite, thus making the production cost very high. High productivity, on the other hand, can be achieved via substantially reduced amount of water or at higher temperature. Even though the $NaClO_2$ conversion may go up, the operational hazard would be increased.

A particularly preferred range of residence time can be between about 0.2 and about 3 hours. A particularly preferred reactor residence time is 40 minutes, although residence times of 20 minutes or less can be used with a relatively high product concentration of 6,270–7,850 mg $ClO_2$/L. Comparing this with the known processes described above, the process of the present invention is at least 100 times faster with an enhanced conversion.

Any material can be used to fabricate the reactor that can withstand the corrosive attack of chlorine dioxide, keeping in mind that chlorine dioxide is corrosive and is a respiratory irritant. If a PVC tubing is used, $ClO_2$ can permeate slowly into the polymeric matrix and stain the tube with a greenish color. This stain can be permanent. If a glass tubing is used, a thin film (greenish color) can be formed on the glass contacting surface. This stain also can be semi-permanent. Even though PVC tubing provides flexibility and cost advantage, its durability in this reaction system is very questionable. Glass tubing may be adequate for small laboratory investigations; however, it seriously lacks the flexibility and impact resistance required for typical commercial application.

Other material choices include poly vinyldene fluoride (PVDF), chlorinated PVC (CPVC), PVDF-lined polyethylene, TFE-lined polyethylene, etc. TFE-lined polyethylene tubing in particular is preferred in accordance with the present invention. The diameter of the tubing can be important if it is required to be flexible since the tubing has to be bent many times for space saving. TFE-lined polyethylene tubing having diameters of ⅜" and ¼" exhibit reasonable flexibility, whereas diameters of ½" or higher can be very rigid at suitable operating temperatures. Furthermore, ½"-tubing may suffer from bubble formation and intermittent 2-phase flow. If a bubble grows to a size that can inhibit the flow of solution, then slight pressure may build up in the tubing. This condition should be avoided since it likely will affect the productivity and may render a safety problem if the process is mishandled.

Bubbles, once formed, can generate larger bubbles by coalescence, and may cause blockage of the flow rate. Therefore, excessive formation of bubbles can be very detrimental to process economics and operational safety. Several causes can be considered as potential and plausible reasons for excessive bubble formation:

(a) dog-legged tube packing in the reactor water bath
(b) larger tube diameter
(c) higher temperature (esp. at local hot spots)
(d) higher concentration (at local spots)
(e) entrapped air
(f) not fully developed flow
(g) unnecessary agitation
(h) turbulent flow Local high spots which are present in the reactor tubing are ideal candidates for stagnant bubble phases. Once bubbles are formed, they will occupy these local high spots and refuse to move forward, thus providing flow hindrance. In order to avoid such an annoying problem, the tube should be placed at a natural and gradual slope in the reactor zone. Tube racks or tube guides may be used to ensure a proper inclination. A device such as this not only is easy to maintain, but also inexpensive to build.

Although the use of a larger diameter reactor tube often is desirable to increase the productivity, it becomes more difficult to suppress bubble formation in a larger diameter tube because of the creation of open void spaces. However, the chance of flow blockage in a larger diameter tube is less likely. Instead, two-phase flows are more likely. This problem usually is more actively taking place at higher temperatures due to higher vaporization potential and less solubilizing capability.

Entrapped air in the reactor system also can be detrimental to the process operation. It not only helps the decomposition of product, but also can create more bubbles and vapor space. All lines should be flushed with water and left filled with water after each production run. Therefore, a new production run typically will follow the filler water flow (not containing reactants), thus providing no chance for air entrapment.

In order to provide a gentle slope of monotonous increase in an effort to eliminate and/or reduce the formation of bubbles, the reactor tube should be packed very carefully. The slope to be provided can be, for example:

$$\frac{1 \text{ ft rise}}{200 \text{ ft length}} = \frac{1}{200}$$

In addition, warm temperatures inside the reactor may result in sagging of the tube which should be prevented. Therefore, typical design criteria for the tube packing include:

(1) ensuring the correct slope
(2) preventing any sagging possibility
(3) minimizing the overhead volume
(4) resisting the temperature over an extended period of time
(5) easy installation and service Using the guidelines presented herein, those skilled in the art are capable of designing a suitable mechanism to support the reactor tube and to provide the requisite slope.

For a reactor material, TFE-lined polyethylene tubing is particularly preferred for a small capacity generator. By means of example, a ⅜" ID tubing has a cross sectional area (inside) of:

$$\{(\tfrac{3}{8})(2.54)\text{cm}\}^2(\tfrac{1}{4})\pi = 0.712 \text{ cm}^2$$

In order to make a total volume of one gallon, the entire length of the reactor should then $$\frac{3{,}786 \text{ cm}^3}{0.712 \text{ cm}^2} = 5{,}300 \text{ cm}$$

$$\cong 53 \text{ m}$$

$$\cong 175 \text{ ft}$$

The L/D of this reactor therefore is $$\frac{L}{D} = \frac{(175 \text{ ft})}{\left(\tfrac{3}{8}\right)\left(\tfrac{1}{12}\right)} \text{ft}$$

$$= 5{,}600$$

With an L/D of 5,600, the reactor flow pattern would be very fully developed, if the flow maintains the original single phase. For an actual design of a generator, 200 ft may be used instead of 175 ft, since the required volume for a water bath is more or less the same. Those skilled in the art recognize that the reactor values can be modified depending on the desired throughput, conversion of sodium chlorite, and concentration of chloride dioxide.

Maintaining a uniform and constant temperature is important for the chlorine dioxide generation system of the invention. The temperature control is important to minimize bubble formation to better manage reaction heat to provide more efficient generation of the product.

Any mechanism can be used to maintain the temperature of the reactor. Preferably, circulating-type, constant-temperature water bath can be used. This preferred means is based on the following reasons:

(1) uniform and constant temperature (2) large thermal mass to dissipate the reaction heat (3) chemical inertness of liquid medium As a heat transfer medium used to maintain the reactor temperature various liquids can be used. These include, for example, water, glycerol, Witco mineral oils (Witco 40, Witco 70, Freezene 100), ethylene glycol, propylene glycol, Exxon heat transfer oil, Dowtherm, etc. Water is particularly preferred for use in accordance with the present invention.

Water has several advantages over others:

(1) inexpensive;

(2) safe for the current system, since the process has to be water-flushed whenever in an emergency mode;

(3) possible incorporation of easy leak detection by monitoring the pH;

(4) no additional chemical reaction with the process acids and other ingredients, in case of reactor leakage; and (5) relatively low temperature operation.

Potential disadvantages, however, may include (a) algae formation and microorganism growth, and (b) cold weather freezing in an outdoor operation. Thus, regular replenishment of water of the temperature bath is recommended. Therefore, a bottom drain plug can be installed on the bath.

A particularly preferred means for maintaining the temperature of the reactor is a Cole-Parmer Model (H-12600-20, 56-liter, 120 v, 50/60 Hz) constant temperature bath. This water bath can heat the content water and the reactor system to 40° C. in 38 minutes. The electrical power input to the system is quite low and the current temperature of the system is displayed in a digital mode. The water temperature and the reactant mixture temperature are preferably identical, whereby the difference between the two is about ±0.1° C.

It is preferred in accordance with the present invention to maintain the pH in the reactor at or below about 5. The pH of reaction mixture is important for the process efficiency. The initial pH control can be effected via adjustment of reactant mixture formulation. The reactant mixture concentration can be predetermined for each specific application by those skilled in the art and fixed prior to providing them to the apparatus at the factory.

The pH of the reactant mixture and the water bath can be monitored continuously. The reactor pH most preferably is in the range of about 2.8 to about 3.8, whereas the water pH should be at about 7±0.1. If the water bath pH decrease below 6.8, the process should be stopped immediately by stopping the feed pumps. This decrease in the pH of the bath water could be due to the leakage of reactant mixture. On the other hand, if the reactor pH goes above 4.0, then there are three possibilities, viz., (1) there is a leak in the reactor, allowing foreign water to enter the system;

(2) there are some abnormalities in the reaction chemistry, possibly due to problems in reactant purity and concentrations; or (3) the pH meter is malfunctioning Those skilled in the art are capable of maintaining the pH of reactor using the guidelines presented herein.

A product solution is withdrawn from the reactor by any mechanism capable of withdrawing an aqueous solution from a reactor. Preferably, the reaction is carried out continuously, and product solution is continuously withdrawn from the reactor. After exiting the reactor, the product solution can either be used directly, or it can be treated further by stripping and absorption. For example, the product solution can be fed to a stripper which includes a gas-liquid inlet line, a liquid outlet and a gas outlet. Preferably, the product solution is contacted with a gas (such as nitrogen, argon or air) and fed to the stripper, usually at the bottom where it is sparged with the liquid present in the stripper. The liquid level in the stripper can be maintained by setting the level of the liquid outlet line. Preferably, a packed column can be used as a stripper. Either glass or ceramic packing materials can be used. With a packed column stripper stripping efficiency is generally increased, such as preferably 90 to 99% of the product $ClO_2$ can be stripped from the solution and then fed to the absorber. Those skilled in the art are capable of designing a suitable stripper given the objectives and guidelines presented herein.

Any mechanism capable of withdrawing the stripped product solution and product gas from the stripper can be used in accordance with the present invention. Product solution preferably is withdrawn from the stripper via a pump, whereby the pump is operated at a level that is compatible with the feed rate of the combined product solution and gas, which is fed to the stripper via the gas-liquid feed line. In one embodiment, a pump is employed to withdraw the stripped product solution which effects a flow rate of about 50 to about 60 cc/min, and the gas is mixed with the product solution at a flow rate of about 500 to about 1,500 cc/min, preferably at about 1,000 cc/min for a one-gallon reactor system.

The stripped product solution then can be sent to a storage tank, or recycled to the reactor. The stripped product solution generally may contain a small amount of chlorine dioxide in it. The concentration is preferably below 1000 mg/l, more preferably below 150 mg/l, even more preferably below 10 mg/l. The product gas that is removed from the stripper then can be fed to an absorber. Alternatively, the product gas first can be fed to a condenser to condense any unreacted acid that may be present in the product gas. Any mechanism for condensing unreacted acid can be used in accordance with the invention, and the skilled artisan is capable of designing a suitable condenser to effect the required separation. If a condenser is used, the chlorine dioxide-containing gas leaving the condenser is fed to an absorber. If a condenser is not employed, the product gas is fed directly to the absorber.

The absorber preferably includes a gas-liquid inlet line, a gas outlet line and a liquid outlet line. Before entering the absorber, water is contacted with the product gas and then fed to absorber, usually at the bottom where it is sparged with the liquid present in the absorber. As with the stripper, the liquid level in the absorber can be maintained by setting the level of the liquid outlet line. Preferably, a packed column with a countercurrent contacting mode can be used as an absorber. Preferably, such a column can be operated with the liquid inlet from the top and the carrier gas input from the bottom, thus establishing a countercurrent contacting mode.

Any mechanism capable of withdrawing liquid from the absorber can be used to withdraw the liquid from the absorber and any mechanism capable of feeding water to the product gas can be used. Preferably, pumps are employed to transfer the respective aqueous solutions, and more preferably, these pumps are operated at the same rate. In this embodiment, the absorber should be charged with the appropriate amount of aqueous medium prior to operation. In a particularly preferred embodiment of the invention, the pumps that feed the water to the product gas (or chlorine dioxide-containing gas if a condenser is used) and withdraw the aqueous chlorine dioxide solution from the absorber operate at about 200 to about 225 cc/min.

The outcoming gas stream from the absorber column contains only minimal levels of $ClO_2$, typically lower than 50 ppm. More preferably all of the chlorine dioxide is absorbed and only clean air is discharged from the top of the absorber column. The pure product chlorine dioxide is recovered as the liquid effluent from the bottom of the absorber column. The product concentration can be varied but typically ranges from 1,000 to 4,000 mg/l. The concentration may be simply varied by adjust liquid and gas flow rates to the column. The final pure product chlorine dioxide aqueous solution does not contain any unreacted chlorite or other form of chlorine. The chlorine dioxide storage system may vary widely depending upon the specific needs and requirements of the end user and also upon the types of the end-use of the product. No matter however the product may be used, it must be kept in mind that the product chlorine dioxide has a very strong tendency to vaporize from its concentrated solution. The vaporization tendency is stronger at higher temperatures. Depending upon the plant requirements, the following are particularly preferred:

(1) minimize the open space volume;

(2) minimize the open top surface area; and (3) keep the product solution at lower temperatures.

By covering the top surface of the solution, vaporization loss of chlorine dioxide can be minimized. This can be accomplished by use of a movable top plate or floats. However, this is not intended to create vacuum over the solution. Minimizing the open space volume makes the vapor space content of product chlorine dioxide minimal, provided that there is no leak. This can be achieved by a dispensing strategy or by a collapsible design of the reactor. Keeping the solution under nitrogen pressure may substantially suppress the chlorine dioxide vaporization.

The chlorine dioxide solubility in water decreases with the temperature. By chilling the product, the product saturation level in the solution can be substantially increased, thereby minimizing the vaporization loss. Conversely, the ambient temperature of the product storage in the summer season, may adversely affect the situation where it will become much harder to keep all or most of the chlorine dioxide in the product solution. Skilled artisans are capable of designing a suitable chlorine dioxide storage tank, using the guidelines provided herein.

The product storage must be sealed very tightly and the product solution be used within 120 hours and more preferably within 96 hours from its production.

Other embodiments of the apparatus of the invention that will be described in more detail below by reference to the figures include an acid pre-wash. In this embodiment, a gas (preferably air, nitrogen or argon) contacts the aqueous acid solution prior to its mixture with the solution containing the alkali metal salt of a chlorite ion to provide an acid gas. The acid gas then is bubbled through the reactor whereby the acid entrained in the gas is absorbed in the aqueous reaction solution. The apparatus of the invention therefore would include a stripper after the acid storage tank, or the acid storage tank would have an inlet gas feed line and an outlet gas feed line. Likewise, the reactor would be equipped with a mechanism capable of accepting the acid gas, and venting the spent gas. Those skilled in the art are capable of designing strippers, storage tanks and reactors capable of carrying out the aforementioned method using the objectives and guidelines provided herein.

In an additional embodiment of the invention, the apparatus may include, in place of the stripper, optional condenser and absorber, a multi-stage countercurrent contactor. Preferably, a two-stage countercurrent contactor is used whereby product solution emanating from the reactor is contacted with gas (nitrogen, argon or air) in a first stage to provide a stripped product solution and a product gas. The stripped product solution then can be sent to storage and/or recycled to the reactor. The product gas is fed to the second contactor whereby it is contacted in a countercurrent manner with an aqueous medium such as water to provide an aqueous chlorine dioxide solution and gas (nitrogen, argon or air).

The invention further includes methods and apparatus for treating water or wastewater whereby the aqueous chlorine dioxide solution is contacted with the water to be treated in a contact vessel. Advantageously, the contact vessel is sealed and operated at atmospheric pressure. The contact vessel may be operated at less than atmospheric pressure when the water to be treated and the aqueous chlorine dioxide solution are fed to the bottom of the contact vessel and the treated water is removed from the upper portion of the contact vessel.

Any contact vessel capable of effecting contact between the water to be treated and the aqueous chlorine dioxide solution can be used in the present invention. Those skilled in the art recognize that the contact time in the contact vessel may vary depending on the particular contaminant that must be removed and/or reduced. In accordance with the method, an operator determines the concentration of the chlorine dioxide in the aqueous chlorine dioxide solution and based on that value, determines the contact time to effect the required purification. For example, if the water to be treated contains about 1,000 CFU/100 ml of fecal coliform, and it must be reduced to a value of less than about 5 CFU/100 ml to meet the requisite safety criteria for that particular area, then the operator can ascertain the contact time by referring to readily available charts. The requisite flow rates of water to be treated and aqueous chlorine dioxide solution then can be adjusted so that, depending on the size of the contact vessel, the requisite contact time is achieved. Typically, the chlorine dioxide solution will remain in contact with the water to be treated for a period of time greater than 10 minutes.

The flow rate of wastewater varies from season to season. Preferably, the apparatus for making chlorine dioxide is an oversized one that will meet the future requirements of disinfecting of wastewater stream. Therefore, it is preferred in one embodiment of the invention to operate the system at 20 minutes residence time at 6,270–7,800 mg $ClO_2$/L. Thus, the resultant $ClO_2$ flow rate becomes 3 gallons per hour @ 6,270–7,800 mg/L and several advantages are expected:

(1) operation is easier;

(2) total production is more than 1.5 gal/hr at 10,000 mg/L;

(3) conversion is nearly the same; and (4) additional conversion up to 10,000 mg/L takes place in the storage.

If any emergency shutoff should become necessary, the best follow-up procedure would require flushing the entire system with water, with reactant feed pumps stopped. Since the normal shut-off procedure is also followed by water flushing and filling for next scheduled (or, unscheduled)

runs, a water flushing line should be installed before a static ;mixer. The preferred flushing time and water amount is:

| minimum | 1.2 × residences time |
| --- | --- |
|  | 1.2 × reactor volume |
| maximum | 3 × residence time |
|  | 3 × reactor volume | with a particularly preferred one at two-times

The contact time usually is represented as a CT value, which denotes the contact time multiplied by the chlorine dioxide concentration. These CT values, or standards, are published, for example, in the 1991 GUIDANCE MANUAL FOR COMPLIANCE WITH THE FILTRATION AND DISINFECTION REQUIREMENTS FOR PUBLIC WATER SYSTEMS USING SURFACE WATER SOURCES, Denver, Colo., American Water Works Association. Hence, by knowing the degree of purification needed, and the concentration of the chlorine dioxide, the contact time in the contact vessel can be readily ascertained by those skilled in the art. In addition, those skilled in the art are capable of designing a suitable contact vessel using the objectives and guidelines provided herein.

A schematic diagram illustrating one separation embodiment of the invention whereby product $ClO_2$ is separated from the product solution is shown in FIG. 1. As FIG. 1 illustrates, two water traps 13, 14 in serial are placed after the reactor vessel 16. These traps serve to strip the $ClO_2$ present in a product gas 17 which has been passed through reactor vessel 16. The inert carrier gas 18 preferably is selected from air, nitrogen or argon, and most preferably is nitrogen or air. Generally, two water traps are sufficient to scrub substantially all of the $ClO_2$ from the product gas 17. As used herein, the term "substantially all," is defined as the removal of 99% or greater of the $ClO_2$ entrained in the product gas stream. Although two water traps are shown in FIG. 1, more or less traps may be used depending on system requirements.

If a water trap is used, the inventors have found that as a general rule of thumb, a vertically long, relatively small volume trap with a low inert gas flow rate, attains a higher concentration of $ClO_2$ in the solution and is thus preferred. Usually, the volume of the water trap is within the range of from about 10% to about 200% of the reactor volume. Another preferred condition is maintaining the temperature of the traps at a low temperature, due to the greater solubility of the chlorine dioxide in the water at lower temperatures. The temperature of the traps is generally within the range of from 4° C. to about 25° C., preferably, within the range of from about 10° C. to about 20° C.

EXAMPLE 1

According to preferred embodiment, a continuous reaction system utilizing both high temperatures, product collection and pH control was tested. A system similar to that exemplified in FIG. 2 was employed. The results are presented in Table 1 below. As Table 1 indicates, a total of nine runs were completed varying both the reactor length and amount of water used. The reactor used was a half-gallon tubular reactor which was operated continuously at 40° C., along with stripping with a nitrogen flow. The reactor was made of 3 coils of ⅝ inch Teflon coated polyethylene tubing. Each coil was 50 feet (1,524 cm) long with an internal volume of 484 ml, thereby providing a 1,449 ml reactor, when the reaction solution was run through all three coils.

Figure 2:
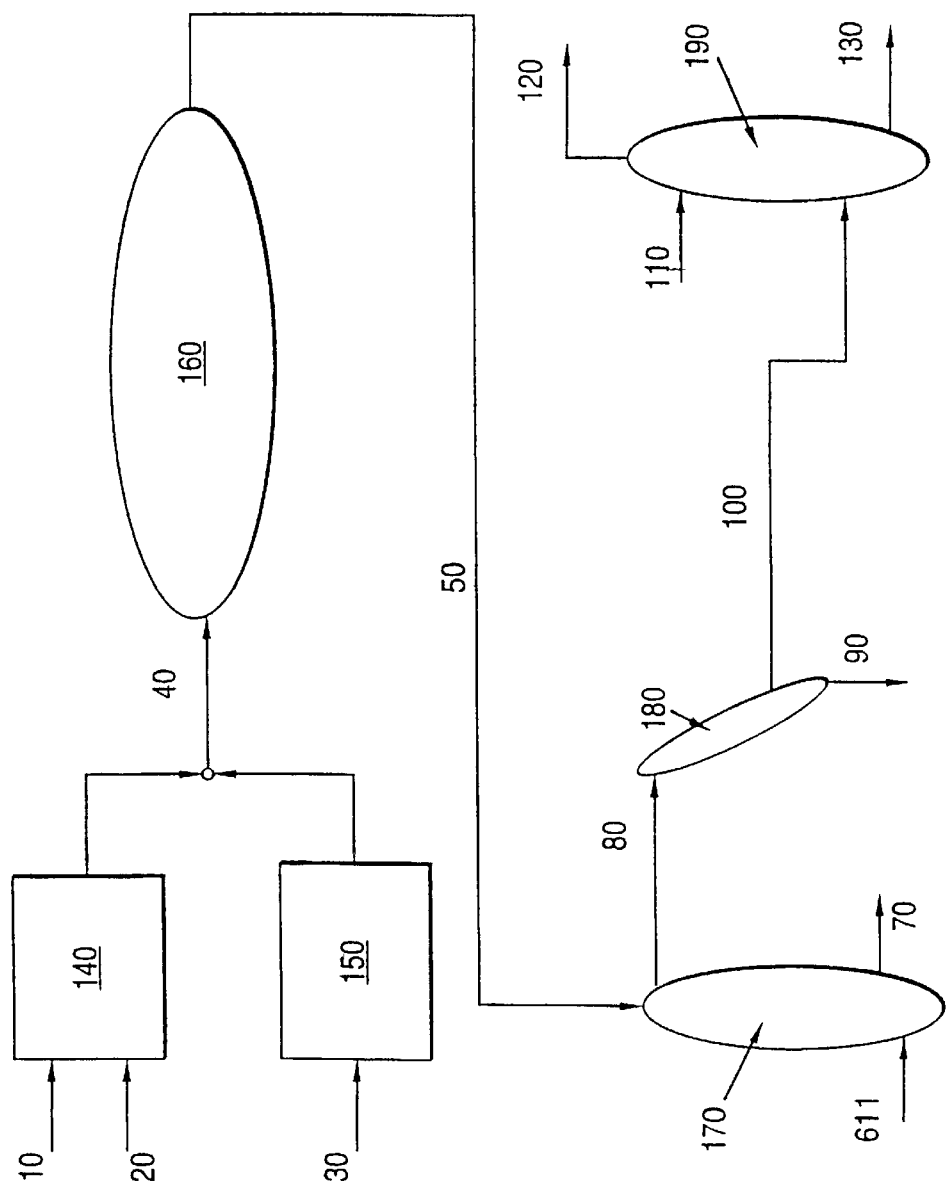
FIG. 2 is a flow/schematic diagram of the process and apparatus for producing chlorine dioxide according to one embodiment of the present invention.

As shown in FIG. 2, acetic acid 10 and lactic acid 20 were fed to and admixed in an acid storage tank 140. Sodium chlorite 30 was fed to a sodium chlorite storage tank 150. An aqueous acid solution was admixed with the sodium chlorite and fed via line 40 to tubular reactor 160. Product solution 50 was fed to a $ClO_2$ stripping unit 170 and contacted countercurrently with nitrogen gas 60. Unreacted sodium chlorite was withdrawn via line 70 and product gas 80 was fed to condenser 180 to condense any acid present in the product gas 80. The condensed acid solution was withdrawn via line 90 and a chlorine dioxide-containing gas 100 was fed to a $ClO_2$ scrubbing unit 190. Water 110 contacted gas mixture 100 whereby scrubbed nitrogen was removed via vent 120 and aqueous chlorine dioxide was withdrawn via line 130.

TABLE 1

| Ex. | Amount of Water | Reactor Length (cm) | Initial $NaClO_2$ (mg/L) | Final $ClO_2^-$ (mg/L) | $ClO_2$ (mg/L) | Conversion | Time (min.) |
| --- | --- | --- | --- | --- | --- | --- | --- |
| 1a | Original | 1,524 | 32,850 | 20,139 | 3,452 | 14.18% | 48 |
|  |  | 3,048 |  | 15,104 | 4,096 | 16.82% | 96 |
|  |  | 4,572 |  | 16,484 | 4,666 | 19.16% | 144 |
| 1b | ½ Water | 1,524 | 65,278 | 54,792 | 10,872 | 22.47% | 48 |
|  |  | 3.048 |  | 44,792 | 11,875 | 24.54% | 96 |
|  |  | 4,572 |  | 35,000 | 11,495 | 23.76% | 144 |
| 1c | ⅓ Water | 1,524 | 97,778 | 85,417 | 23,275 | 32.12% | 48 |
|  |  | 3,048 |  | 62,500 | 20,900 | 28.84% | 96 |
|  |  | 4,572 |  | 37,500 | 18,050 | 24.91% | 144 |

As seen from Table 1, the maximum chlorine dioxide concentration was for the run using ⅓ the normal amount of water and using a single coil reactor. This provided an unexpectedly high concentration of 23,275 mg/L of $ClO_2$ in only 48 minutes which represents nearly a 140 fold increase in chlorine dioxide productivity. Thus, this embodiment of the present invention provides a reproducible concentration of $ClO_2$ which was previously unattainable according to the known methods for producing chlorine dioxide, including simply mixing a companion acid, a hydroxy carboxylic acid and an alkali metal salt of a chlorite ion. Indeed, this amount of chlorine dioxide far exceeds that obtained in the simple mixing test, even after the system used therein was allowed to react for an entire day. The sodium chlorite selectivity (or, pure product conversion) to chlorine dioxide reached over 32% in only 48 minutes.

The inventor also observed that the reactor was supersaturated with the chlorine dioxide vapor and was under a mild pressure due to the presence of the chlorine dioxide vapor. With this high of a concentration of chlorine dioxide, it becomes very important to utilize safe handling and storage of the product due to its mild explosiveness at concentrations in air greater than 11%.

In another preferred embodiment, additional experiments were undertaken varying certain parameters of the methods described above.

EXAMPLE 2

Figure 3:
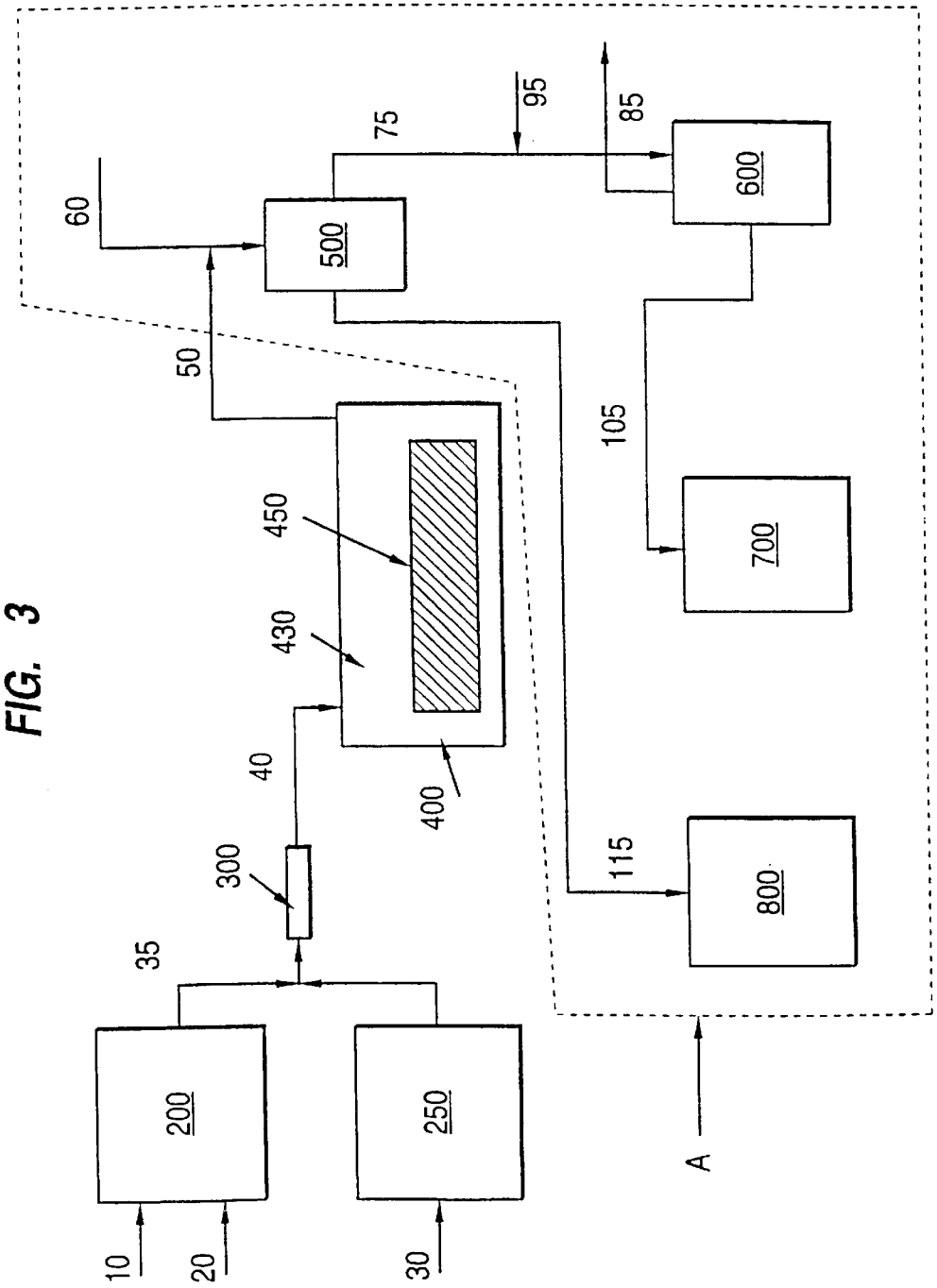
FIG. 3 is a flow/schematic diagram of the process and apparatus for producing chlorine dioxide according to one embodiment of the present invention.

A system similar to that shown in FIG. 3 was operated using the following reaction conditions.

| Chlorite Storage Unit 200 | 352 g $NaClO_2$ 30 |
| --- | --- |
|  | 1,800 ml Water (may be increased)* |
| Acid Storage Unit 250 | 800 ml Acetic Acid 10 |
|  | 160 ml Lactic Acid 20 |
|  | 870 ml Water (may be increased)* |

-continued

| Pumps | |
|---|---|
| #1 | 5 cc/min |
| #2 | 5 cc/min |
| #3 | 10 cc/min |
| Reactor Residence Time | 48 min/each reactor coil |
| | 145 min total for three 50' coils |
| Product Concentration | over 15,000 mg/L |

*, The numbers given are for a super-high product concentration case.

Pump #1 pumps acid from acid storage unit 200, pump #2 pumps sodium chlorite from Chlorite storage unit 250 and pump #3 pumps stripped product 115 from stripper 500.

For most runs, more amounts of water may be used.

For most runs, one or two coils may be used instead of three.

The continuous reactor embodiment illustrated in FIG. 3 provides a high concentration of chlorine dioxide in a short period of time. Companion acid 10 and hydroxy carboxylic acid 30 are fed to acid storage unit 200 along with water for dilution, and aqueous alkali metal salt of a chlorite ion is fed to chlorite storage unit 250. Aqueous acid solution 35 is combined with the sodium chlorite and mixed in mixer 300 and the mixed reaction solution is fed to reactor 400. Preferably, mixer 300 includes a mixer packed with glass beads although other mixers using conventional stirring mechanisms are contemplated within the context of the present invention. Reactor 400 can be any reactor capable of reacting the respective components, and preferably it contains multiple coils 450 surrounded by a water jacket 430.

Product solution 50 then is fed to stripper 500 whereby it is stripped with an inert carrier gas 60, such as nitrogen. Stripped product is removed via line 115 and fed to stripped product storage unit 800, and product gas 75 is fed to an absorber 600 where it is contacted with water 95. Inert gas is vented via vent 85 and aqueous chlorine dioxide is fed via line 105 to $ClO_2$ storage unit 700.

Figure 4:
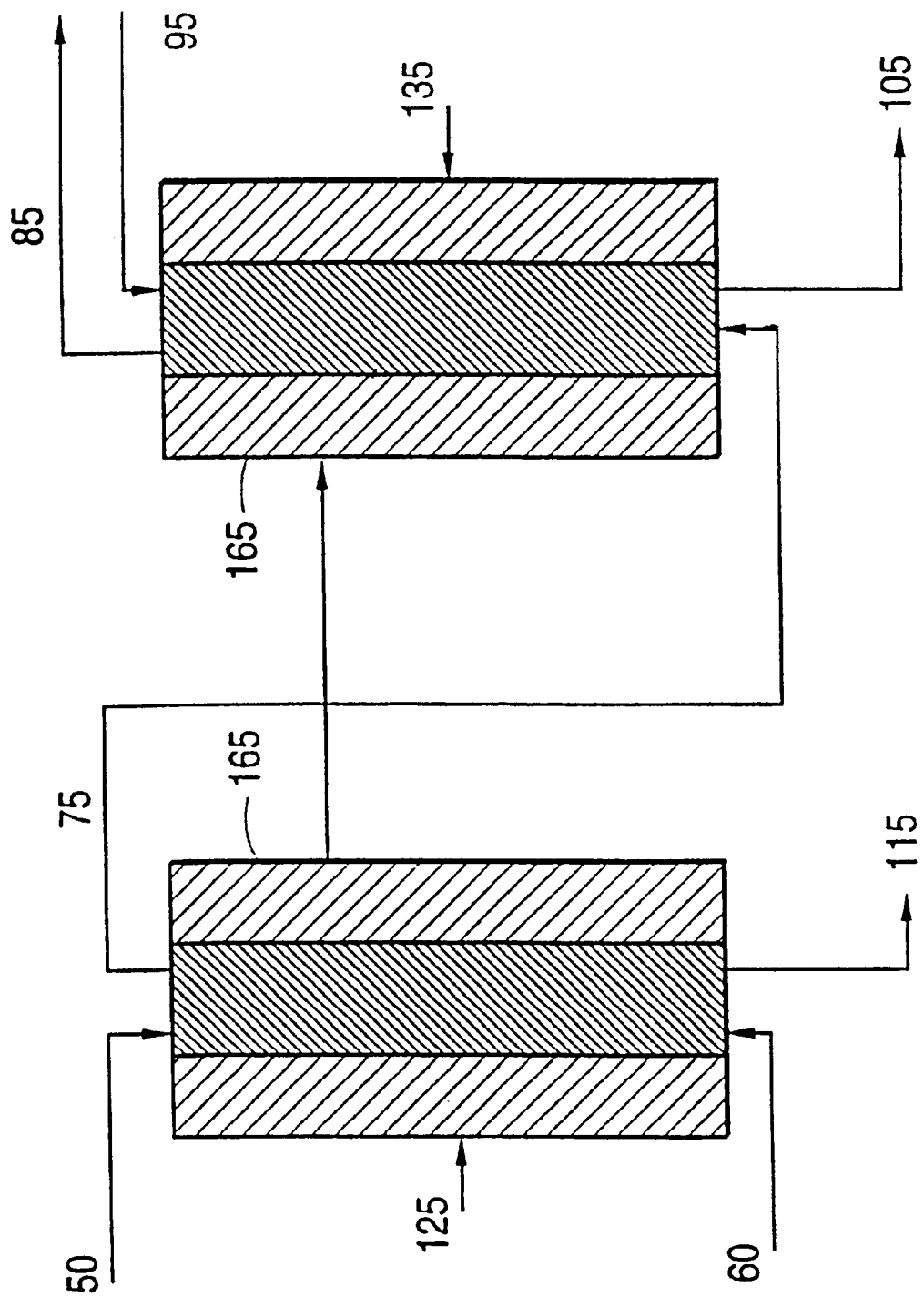
FIG. 4 is a flow/schematic diagram of an alternative embodiment of area A of FIG. 3.

Encircled area "A" in FIG. 3 can be replaced by a two-stage countercurrent contacting cascade, as illustrated in FIG. 4. Here, product solution 50 is fed to a first contactor 125 whereby it is contacted countercurrently with an inert carrier gas 60. Stripped product 115 is removed at the bottom of contactor 125 and product gas 75 is removed at the top and fed to the bottom of contactor 135. Preferably, both contactors 125, 135 are surrounded by a water jacket 165. Product gas 75 is contacted with water 95 in contactor 135 whereby inert gas is vented via vent 85 and aqueous chlorine dioxide is removed via line 105.

As Example 2 indicates, a repeatable continuous process for the production of a high concentration of chlorine dioxide within a short period of time is possible without the formation of undesirable and hazardous by-products is now within the reach of those skilled in the art.

Figure 5:
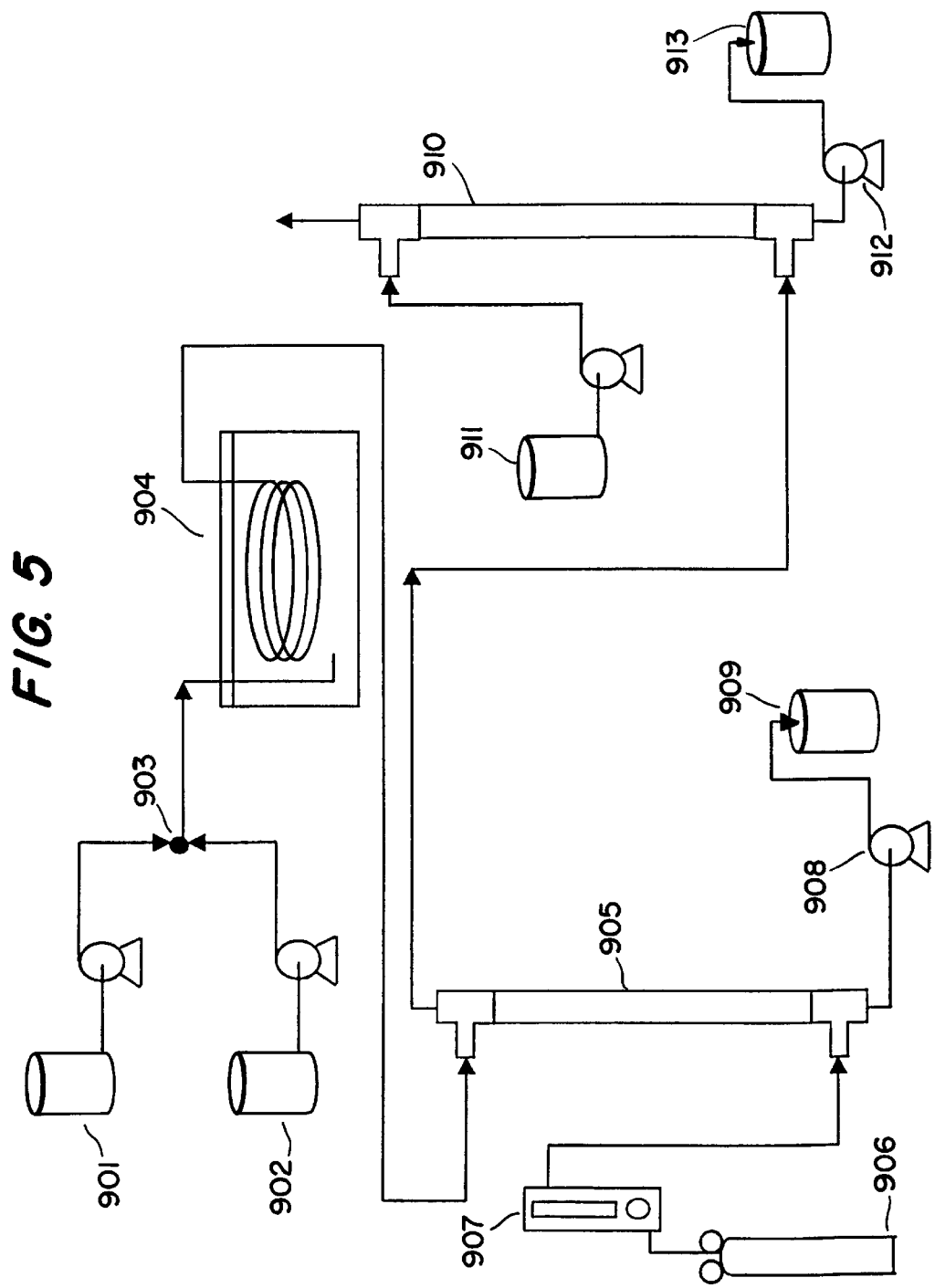
FIG. 5 is a schematic diagram of the process and apparatus for producing chlorine dioxide according to one embodiment of the present invention.

FIG. 5 is a schematic diagram of a continuous chlorine dioxide process and apparatus for producing chlorine dioxide according to one embodiment of the present invention. The apparatus includes: a companion acid storage tank or drum 901; a $NaClO_2$ storage tank or drum 902; a mixing point 903; a temperature controlled tubular reactor 904; a vertical chlorine dioxide stripper 905, such as that shown in FIG. 6a; a gas supply 906, such as air; a flowmeter 907; a metering pump 908, a storage tank or drum for unreacted $NaClO_2$ 909; a vertical chlorine dioxide absorber 910, such as that shown in FIG. 6b; a source of water 911 for supplying the absorber; a metering pump 912; and a storage tank or drum 913 for receiving the aqueous $ClO_2$ product.

FIG. 6a is a schematic diagram of a stripper according to one embodiment of the present invention. The stripper 1 includes two one inch tees 2 with a one inch inside diameter pipe 3.

FIG. 6b is a schematic diagram of an absorber according to one embodiment of the present invention. The absorber 4 includes two 1.25 inch tees 5 with a one inch inside diameter pipe 6. Both the stripper 1 and the absorber 4 are preferably packed with 6 mm porcelain berl saddles. The stripper and absorber are preferably constructed from PVDF or more preferably nontransparent, gray-colored CPVC tubes.

EXAMPLE 3

Chlorine dioxide in an apparatus using an absorber and stripper as described in FIG. 6a and 6b was carried out. The height of each stripper and absorber column was 8 feet.

Using an air flow rate of 10.5 scfh (standard $ft^3/h$) the results were as follows:

| Reactor | 1.5 gal/h @ 5,000–5,500 m/L of $ClO_2$. |
|---|---|
| Stripper | waste stream 1.5 gal/h @ 138 mg/L of $ClO_2$. |
| Absorber | product $ClO_2$ in water was 5.3 gal/h @ 1090 mg/L $ClO_2$. |
| | Air from the top of the absorber contained less than 5 ppm $ClO_2$. |
| Changing the air flow rate to 8.5 scfh resulted as follows: | |
| Reactor | 1.5 gal/h @ 5,000–5,500 m/L of $ClO_2$. |
| Stripper | waste stream 1.5 gal/h @ 348 mg/L of $ClO_2$. |
| Absorber | product $ClO_2$ in water was 5.3 gal/h @ 1090 ± 30 mg/L $ClO_2$. |

The efficiency of Example 3 was better than 97% recovery of pure chlorine dioxide product, and the waste output of $ClO_2$ was less than 140 mg/L.

Other embodiments of the invention will be apparent to those skilled in the art from consideration of the specification and practice of the invention disclosed herein. It is intended that the specification be considered as exemplary only, with the true scope and spirit of the invention being indicated by the following claims.

The disclosure of all publications described above expressly are incorporated herein by reference in their entirety. In the claims that follow, the terms "a" and "an" shall mean "at least one" unless otherwise indicated.

What is claimed is:

1. An apparatus for making chlorine dioxide comprising:

A an acid storage tank comprising inlet means for accepting at least one acid and an outlet means for withdrawing an aqueous acid solution from said acid storage tank;

B a chlorite ion storage tank comprising inlet means for accepting an alkali metal salt of a chlorite ion and an outlet means for withdrawing said alkali metal salt of a chlorite ion from said chlorite ion storage tank;

C mixing means for mixing said alkali metal salt of a chlorite ion and said aqueous acid solution to provide an aqueous reaction solution, said mixing means being in fluid communication with said outlet means of said chlorite ion storage tank and said outlet means of said acid storage tank;

D reacting means in fluid communication with said mixing means for reacting said aqueous reaction solution to provide a product solution, said reacting means comprising an outlet means for withdrawing said product solution;

E stripping means for stripping chlorine dioxide present in said product solution from said product solution and into a gas to provide a product gas and a stripped product solution, said stripping means being in fluid communication with said outlet means of said reacting means; and F absorbing means for absorbing chlorine dioxide present in said product gas to provide an aqueous chlorine dioxide solution.

2. The apparatus as claimed in claim 1, wherein said mixing means comprises a tee intersection followed by a tube packed with glass beads.

3. The apparatus as claimed in claim 1, wherein said reacting vessel comprises a tubular reactor.

4. The apparatus as claimed in claim 3, wherein said tubular reactor is surrounded by a water jacket.

5. The apparatus as claimed in claim 1, wherein said stripping means comprises a vertical column packed with column packing materials.

6. The apparatus as claimed in claim 1, wherein said absorbing means comprises a vertical column packed with column packing materials.

7. An apparatus for disinfecting water containing contaminants comprising:

A an acid storage tank comprising inlet means for accepting at least one acid and an outlet means for withdrawing an aqueous acid solution from said acid storage tank;

B a chlorite ion storage tank comprising inlet means for accepting an alkali metal salt of a chlorite ion and an outlet means for withdrawing said alkali metal salt of a chlorite ion from said chlorite ion storage tank;

C mixing means for mixing said alkali metal salt of a chlorite ion and said aqueous acid solution to provide an aqueous reaction solution, said mixing means being in fluid communication with said outlet means of said chlorite ion storage tank and said outlet means of said acid storage tank;

D reacting means in fluid communication with said mixing means for reacting said aqueous reaction solution to provide a product solution, said reacting means comprising an outlet means for withdrawing said product solution;

E stripping means for stripping chlorine dioxide present in said product solution from said product solution and into a gas to provide a product gas and a stripped product solution, said stripping means being in fluid communication with said outlet means of said reacting means;

F absorbing means for absorbing chlorine dioxide present in said product gas to provide an aqueous chlorine dioxide solution;

G a second mixing means for mixing said aqueous chlorine dioxide solution from said absorbing means and water containing contaminants; and H a contact vessel in fluid communication with said second mixing means designed to provide sufficient contact between said aqueous chlorine dioxide solution and said water containing contaminants to effective remove and/or reduce the contaminants in said water.

* * * * *